US008571307B2

(12) United States Patent
Li et al.

(10) Patent No.: US 8,571,307 B2
(45) Date of Patent: Oct. 29, 2013

(54) METHOD AND SYSTEM OPERATIVE TO PROCESS MONOCHROME IMAGE DATA

(75) Inventors: Jingquan Li, Auburn, NY (US); Robert M. Hussey, Waxhaw, NC (US); Justin Hnatow, New York City, NY (US); Stephen Patrick Deloge, Palmyra, NY (US)

(73) Assignee: Hand Held Products, Inc., Fort Mill, SC (US)

( * ) Notice: Subject to any disclaimer, the term of this patent is extended or adjusted under 35 U.S.C. 154(b) by 325 days.

(21) Appl. No.: 12/947,076

(22) Filed: Nov. 16, 2010

(65) Prior Publication Data

US 2012/0121209 A1 May 17, 2012

(51) Int. Cl.
*G06K 9/00* (2006.01)

(52) U.S. Cl.
USPC ........... 382/162; 382/167; 382/168; 382/237; 382/270; 382/254

(58) Field of Classification Search
USPC ......... 382/162, 167, 168, 237, 270, 274, 254; 358/1.2, 3.13, 472, 457; 345/596, 597, 345/598, 599, 600; 348/453
See application file for complete search history.

(56) References Cited

U.S. PATENT DOCUMENTS

| | | | |
|---|---|---|---|
| 4,695,884 A | 9/1987 | Anastassiou et al. | |
| 4,803,558 A | 2/1989 | Hiratsuka et al. | |
| 4,924,521 A | 5/1990 | Dinan et al. | |
| 4,977,605 A | 12/1990 | Fardeau et al. | |
| 4,996,603 A | 2/1991 | Kanemitsu et al. | |
| 5,301,271 A | 4/1994 | Hiratsuka et al. | |
| 5,568,571 A | 10/1996 | Willis et al. | |
| 6,172,773 B1 * | 1/2001 | Ulichney | 358/3.13 |
| 6,641,053 B1 | 11/2003 | Breidenbach et al. | |
| 6,757,438 B2 | 6/2004 | Graffagnino | |
| 6,876,763 B2 | 4/2005 | Sorek et al. | |
| 6,990,235 B2 | 1/2006 | Katsuyama | |
| 7,110,607 B2 | 9/2006 | Fujimoto et al. | |

(Continued)

FOREIGN PATENT DOCUMENTS

| | | |
|---|---|---|
| EP | 0349234 A2 | 1/1990 |
| EP | 1519564 A1 | 3/2005 |

(Continued)

OTHER PUBLICATIONS

U.S. Appl. No. 12/947,055, filed Nov. 16, 2010 (35 pages).

(Continued)

*Primary Examiner* — Ali Bayat
(74) *Attorney, Agent, or Firm* — Additon, Higgins, Pendleton & Ashe, P.A.

(57) ABSTRACT

A method and system operative to process monochrome image data are disclosed. In one embodiment, the method can comprise the steps of receiving monochrome image data, segmenting the input pixel values into pixel value ranges, assigning pixel positions in the lowest pixel value range an output pixel value of a first binary value, assigning pixel positions in the highest pixel value range an output pixel value of a second binary value, wherein the first and second binary values are different, and assigning pixel positions in intermediate pixel value ranges output pixel values that correspond to a spatial binary pattern. The resulting binary image data can be written to a file for subsequent storage, transmission, processing, or retrieval and rendering. In further embodiments, a system can be made operative to accomplish the same.

24 Claims, 9 Drawing Sheets

(56) References Cited

U.S. PATENT DOCUMENTS

| | | |
|---|---|---|
| 7,123,768 B2 | 10/2006 | Mori |
| 7,130,442 B2 | 10/2006 | Braudaway et al. |
| 7,155,051 B2 | 12/2006 | Murakawa |
| 7,280,688 B2 | 10/2007 | Katsuyama |
| 7,373,008 B2 | 5/2008 | Clouthier et al. |
| 7,412,099 B2 | 8/2008 | D'Ortenzio et al. |
| 7,415,154 B2 | 8/2008 | Hoogendijk |
| 7,583,814 B2 | 9/2009 | Braudaway et al. |
| 2002/0008715 A1 | 1/2002 | Sorek et al. |
| 2002/0150276 A1 | 10/2002 | Chang |
| 2003/0156753 A1 | 8/2003 | Fan et al. |
| 2005/0018918 A1* | 1/2005 | Keithley ............... 382/254 |
| 2005/0157318 A1* | 7/2005 | Harrington ............. 358/1.9 |
| 2005/0244060 A1 | 11/2005 | Nagarajan et al. |
| 2006/0080031 A1 | 4/2006 | Cooper et al. |
| 2006/0093383 A1 | 5/2006 | Buchheit |
| 2006/0238784 A1 | 10/2006 | Lee |
| 2007/0116367 A1 | 5/2007 | Yamamoto |
| 2008/0135440 A1 | 6/2008 | Antal et al. |
| 2008/0225342 A1 | 9/2008 | Lin |
| 2008/0266580 A1 | 10/2008 | Choi et al. |
| 2010/0046034 A1 | 2/2010 | Nagarajan et al. |
| 2010/0092087 A1 | 4/2010 | Cooksey et al. |
| 2010/0129004 A1 | 5/2010 | Ogawa |
| 2010/0158390 A1* | 6/2010 | Mathew et al. ........... 382/205 |
| 2011/0052059 A1* | 3/2011 | Mathew et al. ........... 382/168 |

FOREIGN PATENT DOCUMENTS

| | | |
|---|---|---|
| EP | 1641282 A1 | 3/2006 |
| WO | WO02056255 A2 | 7/2002 |
| WO | WO-2006080031 A1 | 8/2006 |
| WO | WO-2006093383 A1 | 9/2006 |
| WO | WO-2008135440 A2 | 11/2008 |

OTHER PUBLICATIONS

Mar. 12, 2012 European Search Report in European Patent Application No. 11189062.

Mar. 27, 2012 Communication Pursuant to Article 94(3) EPC in European Patent Application No. 11189062.

Nov. 8, 2012 Invitation Pursuant to Article 94(3) and Rule 71(1) EPC in European Application No. 11189062.

Dec. 17, 2012 Restriction Requirement in U.S. Appl. No. 12/947,055.

Apr. 22, 2013 Office Action in U.S. Appl. No. 12/947,055.

Russ Adams, "Bar Code 1-A Web of Information About Bar Code", Dec. 31, 1995, www.adams1.com/pub/russadam/stack.html.

Ricardo L. De Queiroz et al., "Color to Gray and Back: Color Embedding Into Textured Gray Images", IEEE Transactions on Image Processing, vol. 15, No. 6, pp. 1464-1470, Jun. 2006.

Bo Yang, Pengfei Li, Liang Li, Xue Wang. "Image Coding for Binary Document Based on the Regional Features". Information Engineering and Computer Science, 2009. ICIECS 2009. International Conference on, IEEE, Piscataway, NJ, USA, Dec. 19, 2009, pp. 1-4.

Search Report in European Patent Application No. 11189061.2, Jan. 30, 2013 (3 pages).

Communication pursuant to Article 94(3) EPC in European Application No. 11189061.2 Feb. 12, 2013.

* cited by examiner

METHOD AND SYSTEM OPERATIVE TO PROCESS MONOCHROME IMAGE DATA

FIELD OF THE INVENTION

The present invention relates to image data in general and specifically to a method and system for image data processing.

BACKGROUND OF THE PRIOR ART

Image sensor based terminals are known to be used in industrial data collection applications. For example, image sensor based indicia reading terminals have been used for a number of years for purposes of decoding information encoded in bar code symbols. Commercially available image sensor based terminals have monochrome image sensors that are preferred for their high signal to noise ratios that facilitate reliable decoding of bar code symbols by processing a captured image through one or more decoding algorithms.

In some applications, users take pictures with image sensor based terminals. However, the monochrome images produced using these image sensor based terminals can be of poor visual quality, with the resulting image data being stored in large files that can only be processed using proprietary hardware or software. Some applications require further image processing to correct distortions and enhance overall image quality. In other applications, using shade quantization to reduce the number of shades represented in an image may necessary. This image processing can involve converting and manipulating the image data in binary form for convenience, efficiency and storage considerations.

Because of these distortions and imperfections, in cases where the original subject matter of the picture is binary in nature, for example a single-color document, barcode or fingerprint, a binary representation may not provide a true representation of the original image, and more than two shades may be necessary to accurately represent it. In other cases, where the original subject matter or image inherently contains more than two shades, for example a form having a gray watermark or a map with various colored regions, generally a binary image cannot be used to represent the original and additional shades may be necessary. In these situations, it is often necessary to use more than one bit per pixel to represent an image.

It would be useful to have a system and method for storing and retrieving monochromatic images in binary format, whereby each pixel in the image is represented by a single binary value, while still providing a good quality representation of the original image, thereby reducing storage space requirements and facilitating processing of that image by legacy systems designed to process binary files.

SUMMARY OF THE INVENTION

A method and system operative to process monochrome image data are disclosed. In one embodiment, the method comprises the steps of receiving monochrome image data, the monochrome image data comprising a plurality of input pixel values corresponding to a plurality of pixel positions in an image, wherein the input pixel values are represented as N-bit values, and wherein N>1, defining a plurality of pixel value ranges, the pixel value ranges comprising a low range, a high range, and at least one intermediate range, assigning each of the input pixel values to one of the pixel value ranges, assigning pixel positions having input pixel values assigned to the low range an output pixel value that is a first binary value, assigning pixel positions having input pixel values assigned to the high range an output pixel value that is a second binary value, wherein the second binary value is different than the first binary value, and assigning pixel positions having input pixel values assigned to an intermediate range output pixel values representative of a spatial binary pattern, wherein the spatial binary pattern assigned to each of the at least one intermediate ranges is different. In other embodiments, a method for writing the processed image data to a custom or standard file format, and subsequently retrieving that file and rendering the image is disclosed. In still further embodiments, systems can be made operative to accomplish the same.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

DETAILED DESCRIPTION OF THE INVENTION

A method and system operative to process monochrome image data are disclosed. Monochrome image data can be provided, for example, by a raw frame of image data or an image file having a custom or standardized image file format. Information in the image file can be extracted to obtain a frame of monochrome image data. In one embodiment, the method comprises the steps of receiving a frame of monochrome image data, the frame of monochrome image data comprising a plurality of input pixel values corresponding to a plurality of pixel positions in an image, wherein the input pixel values are represented as N-bit values, and wherein N>1, defining a plurality of pixel value ranges, the pixel value ranges comprising a low range, a high range, and at least one intermediate range, assigning each of the input pixel values to one of the pixel value ranges, assigning pixel positions having input pixel values assigned to the low range an output pixel value that is a first binary value, assigning pixel positions having input pixel values assigned to the high range an output pixel value that is a second binary value, wherein the second binary value is different than the first binary value, and assigning pixel positions having input pixel values assigned to an intermediate range output pixel values representative of a spatial binary pattern, wherein the spatial binary pattern assigned to each of the at least one intermediate ranges is different. Colors can be assigned to each of the pixel value ranges. In further embodiments, a method for writing the processed image data to a custom or standard file format, and subsequently retrieving that file and rendering the image is disclosed. In still further embodiments, systems can be made operative to accomplish the same.

Figure 1:
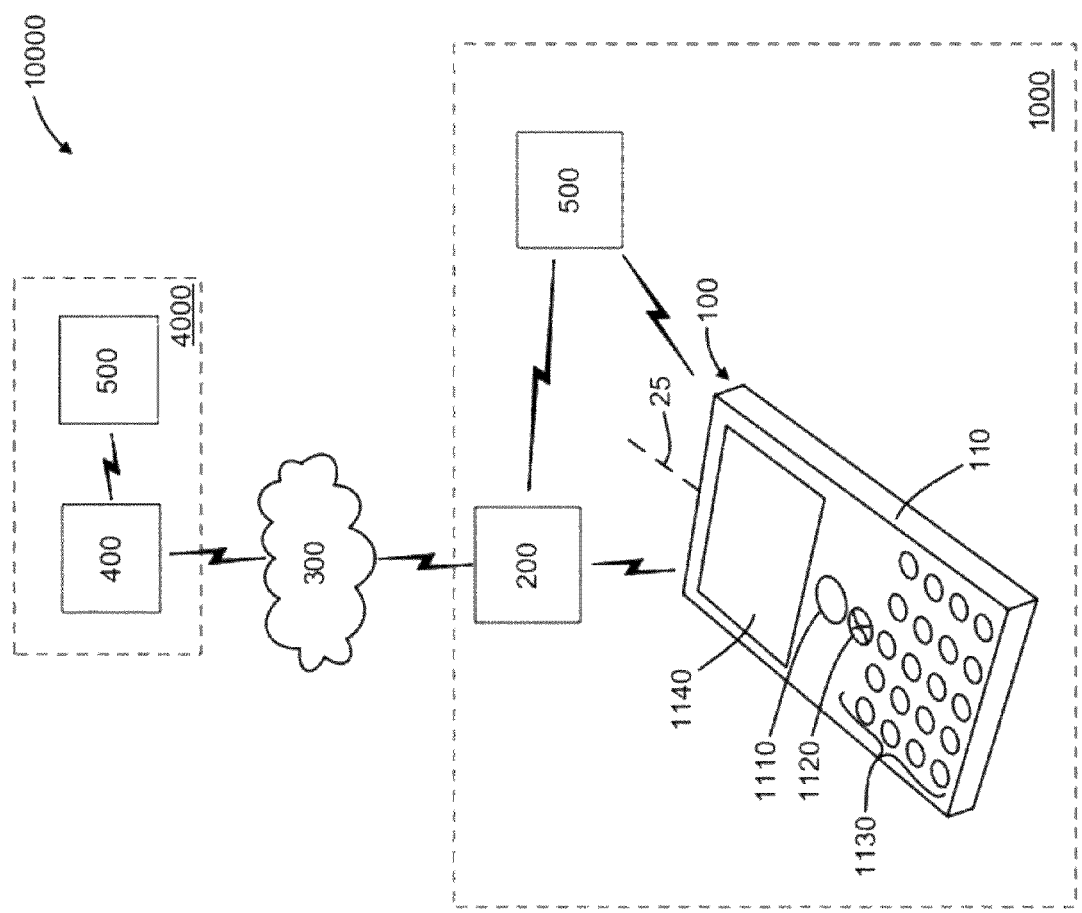
FIG. 1 is an exemplary system block diagram illustrating a data collection system in one embodiment.

In FIG. 1 there is shown a data collection system 10000. At a local facility 1000 there can be disposed a plurality of imaging reading terminals 100. In one example, local facility 1000 can be provided by a retail store. In another example, local facility 1000 can be provided by a warehouse. In another example, local facility 1000 can be provided by a health care facility. In one example, local facility 1000 can be provided by a personal residence. At local facility 1000 there can be included server 200 external to terminal 100.

Terminals 100 and server 200 can be in communication with a remote server 400 via network 300 which can be, e.g., a TCP/IP network. Server 400 can be disposed at a facility 4000 remote from facility 1000.

There can also be included in system 10000 one or more client computers 500. Client computer 500 in one embodiment can be provided by, e.g. a desktop personal computer, a laptop personal computer, or a smart phone, e.g. an IPHONE by Apple Computers, Inc. or a BLACKBERRY STORM by Research in Motion Limited.

Figure 2:
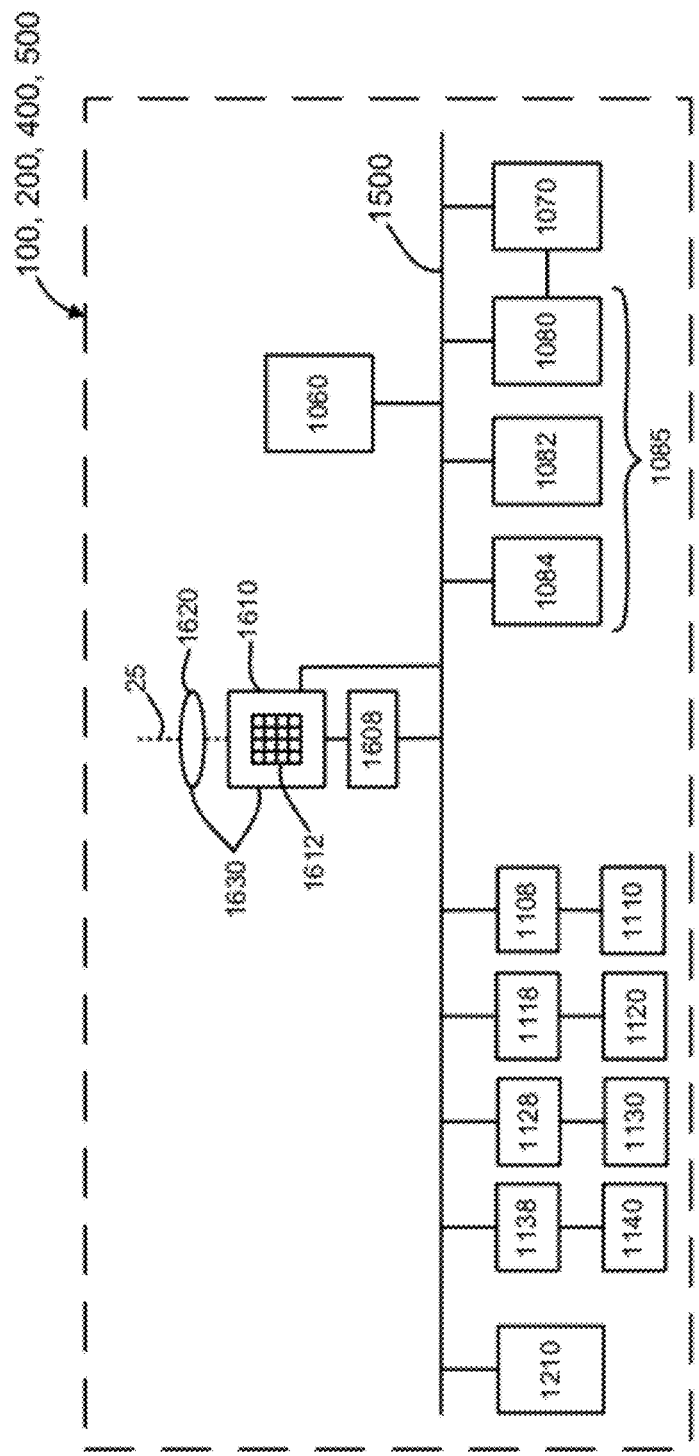
FIG. 2 is an exemplary block diagram of an imaging terminal in one embodiment having the components which can be incorporated in a server or client computer of a data collection system.

FIG. 2 is a block diagram illustrating exemplary components of terminal 100. In one embodiment, terminal 100 can include a CPU 1060 in communication with memory 1085 via system bus 1500. Memory 1085 can include one or more of a system volatile memory 1080, e.g. RAM, a system non-volatile memory 1082, e.g. ROM, and a long-term storage memory device 1084, e.g. a hard drive, CD, floppy and/or flash memory device. Memory 1080, memory 1082 and memory 1084 can be regarded as recording medium.

Referring to further aspects of terminal 100, terminal 100 can include a trigger 1110, pointer mechanism 1120, a keyboard 1130, and a display 1140. Each of the devices 1110, 1120, 1130, and 1140 can be communicatively coupled to system bus 1500 for communication with CPU 1060 via respective interfaces 1108, 1118, 1128, and 1138.

Referring to further elements of terminal 100, one embodiment of terminal 100 can include I/O device 1210 for providing communication with an external computer. I/O device 1210 can be a wire line communication I/O device, e.g. an Ethernet device or a USB I/O device, or a wireless communication device, e.g. an IEEE 802.11 communication interface device or a Bluetooth interface device. Terminal 100 can include more than one I/O device 1210.

Referring to further aspects of terminal 100, terminal 100 can include one or more imaging assemblies. In the specific example, terminal 100 includes a monochrome imaging assembly 1630. Imaging assembly 1630 can include an image sensor pixel array 1612, a monochrome image sensor 1610 and an imaging lens assembly 1620 for focusing light onto image sensor pixel array 1612. Imaging assembly 1630 can have an imaging axis 25. Image sensor 1610 can have monochrome image sensor pixel array 1612 having a plurality of monochrome pixels disposed in a 2D array having a plurality of rows and columns. Image sensor pixel array 1612 can be devoid of color filters so that pixels of array 1612 are sensitive to light in substantially all wavelengths in the visible spectrum.

Image sensor 1610 can be provided in an image sensor integrated circuit having output processing circuitry for amplifying and digitizing image signals output by image sensor pixel array 1612. For capture of a frame of image data, image signals representing light incident on pixels of array 1612 can be read out of image sensor pixel array 1620, digitized and stored into system volatile memory 1080. Prior to read out, pixels of array 1620 can be exposed during an exposure period. Signals for control of image sensor 1610, e.g. readout and exposure signals, can be input by interface 1608 which can be communicatively coupled to system bus 1500 for providing communication with CPU 1060. Imaging terminal 100 can be operative so that terminal 100 captures a frame of image data in response to trigger 1110 being actuated. A frame captured into memory 1080 prior to further processing by CPU 1060 can be regarded as a raw frame of image data.

Figure 3:
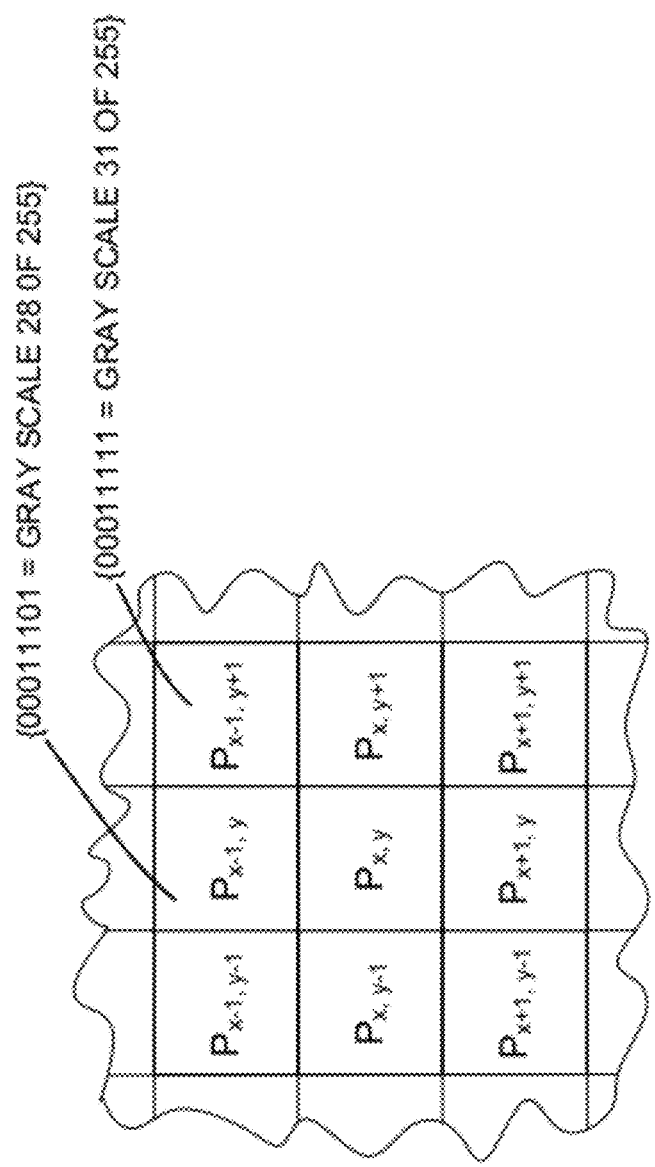
FIG. 3 is an exemplary representation in one embodiment of a raw frame that can be captured with use of a monochrome imaging assembly.

A raw frame of image data captured utilizing monochrome image array 1612 can have the format as shown in FIG. 3. The raw frame of image data can have a plurality of pixel positions (represented by a square in FIG. 3), each pixel position corresponding to a pixel position of image sensor array 1612, which represents a particular point region in target space. Each pixel position of the raw frame can have an associated N-bit input pixel value, N>1. In the specific example, i.e. N=8, each pixel position is represented by an 8-bit input pixel value. Each N-bit value represents light incident on a pixel of array 1612.

For attempting to decode a bar code symbol, e.g. a one dimensional bar code symbol, a CPU of system 10000, e.g. CPU 1060 of terminal 100, can process image data of a frame corresponding to a line of pixel positions (e.g., a row, a column, or a diagonal set of pixel positions) to determine a spatial pattern of dark and light cells, and can convert each light and dark cell pattern determined into a character or character string via table lookup. Where a decodable indicia representation is a 2D bar code symbology, a decode attempt can comprise the steps of locating a finder pattern using a feature detection algorithm, locating matrix lines intersecting the finder pattern according to a predetermined relationship with the finder pattern, determining a pattern of dark and light cells along the matrix lines, and converting each light pattern into a character or character string via table lookup. In one embodiment, system 10000 can be operative to capture a frame of image data and process the frame for attempting to decode the frame responsively to an actuation of trigger 1110.

Terminal 100 can be operative so that responsive to an actuation of trigger 1110, terminal 100 captures a frame of image data and subjects image data of a frame to a decode attempt. Also, responsive to an actuation of trigger 1110, terminal 100 can format image data of a captured frame into a standard image file format, e.g., BMP, PDF, JPG, TIF, and can transmit the formatted image file to an external computer, e.g., server 200, server 400, or client computer 500. A standard image file format can be in accordance with a standard developed by a standard forming entity, can be an open source standard, or can be a proprietary standard developed by an entity for use by third parties. A standard image file format can be viewed or used with a commercially other otherwise publicly accessible viewer.

FIG. 1 shows a physical form view of terminal 100 in one embodiment. Components described with reference to FIG. 2 can be supported within a portable hand held housing 110. Referring to further aspect of system 10000, each of server 200, server 400, and client computer 500 can include components described with reference to terminal 100. In some instances, terminal 100, server 400 and client computer 500 can have devices in addition to those shown in FIG. 2. In some instances servers 200, 400 and client computer 500 can have components deleted relative to those shown in FIG. 2 (for example, server 200 can be devoid of a display 1140 and imaging assembly 1630).

By virtue of their including at least a central processing unit (CPU) 1060 in combination with a memory 1085, each of terminal 100, server 200, server 400, and client computer 500 of system 10000 can be regarded as a "computer." Each computer of system 10000 can be configured in accordance with the TCP/IP protocol so that each computer of system 10000 can be in IP network communication with each other computer of system 10000. While system 10000 in one embodiment is described as having the elements 100, 200, 300, 400, 500, system 10000 can be implemented in such manner as to have less than all of the noted elements, e.g., only one of the noted elements.

Referring to further aspects of system 10000, one or more computers can be operative to perform processing as is described with reference to the flow diagrams of FIGS. 4 and 8. By one or more computers performing processing, it is meant that a single computer, e.g. by a CPU 1060 of the computer executing program instructions, can perform a processing described, or, alternatively, a plurality of computers of system 10000 can perform a described processing in accordance with a multi-computer distributive processing scheme.

Figure 4:
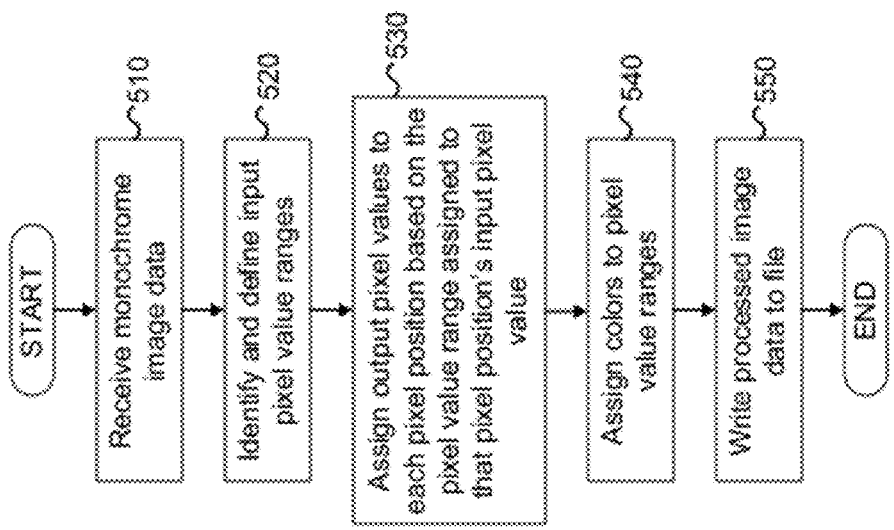
FIG. 4 is an exemplary flow diagram in one embodiment of the steps by which a monochrome frame can be stored as a binary file while preserving shade information.

FIG. 4 is an exemplary flow diagram in one embodiment of the invention depicting the steps by which a monochrome frame can be stored as a binary file while preserving shade information. In step 510, monochrome image data can be received and stored into memory 1085. Image data can be provided by, for example, a raw frame of image data or a formatted image file. Initiation of step 510 and further processing of the image data can take place, for example, in response to actuation of a trigger 1110, automatically in response to system 10000 receiving a file, or at some other time in response to a user identified rule established through a user interface.

Figure 5:
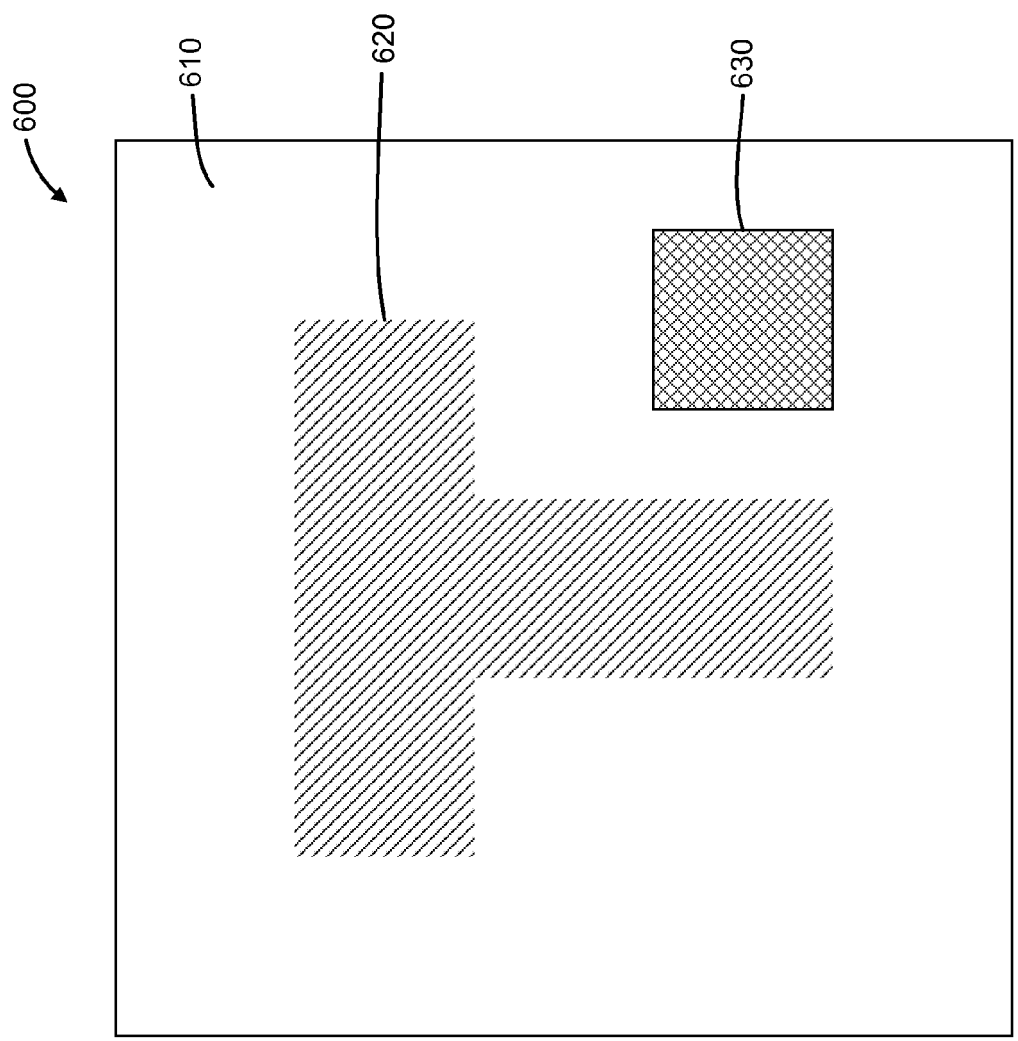
FIG. 5 is an exemplary monochrome frame having three levels of shading.

Once resident in memory 1085, the image data can be identified for further processing by CPU 1060, with each pixel position of the image data having an input pixel value of 0 to 255. FIG. 5 shows an exemplary monochrome frame 600 that is twenty pixel positions wide by twenty pixel positions high, having three spatial regions 610, 620 and 630, each having a degree of shading such that spatial region 610 appears white, spatial region 620 appears gray, and spatial region 630 appears black. When readied for processing, the input pixel values for each of the pixel positions can be stored in system volatile memory 1080.

With reference again to FIG. 4, in step 520, the pixel values within the image data can be grouped into at least three different ranges such that a low range, a high range and at least one intermediate range is defined, $R_0$ through $R_{X-1}$, where X represents the number of ranges determined for a given frame. For example, a frame of image data having pixel positions with input pixel values between 0 and 255 may be divided into three ranges $R_0$, $R_1$, and $R_2$, where $R_0$ can be assigned input pixel values in the range 0 to 100, $R_1$ can be assigned input pixel values in the range 101 to 200, and $R_2$ can be assigned input pixel values in the range 201 to 255. The number of ranges and the values assigned to each range can be arbitrarily chosen based on various factors, for example, a detected level of illumination, the hardware and software limitations of a given data collection system 10000, the number and distribution of input pixel values in the image data, or known optimal values for a given image type. In some embodiments, the number of ranges can be chosen in order to reduce the number of shades represented in an image, or the image can first undergo color quantization to reduce the number of shades. In one embodiment, the number of ranges and the values assigned to each range can be automatically determined by the CPU 1060, for example, through dynamic processing of data or through static table or memory lookup. In other embodiments, the selection of ranges and values can be manually controlled by user selection or input. Accordingly, CPU 1060 can process a frame of image data by assigning each pixel position to the pixel value range, $R_0$ through $R_{X-1}$, which corresponds to that pixel position's input pixel value.

Figure 6:
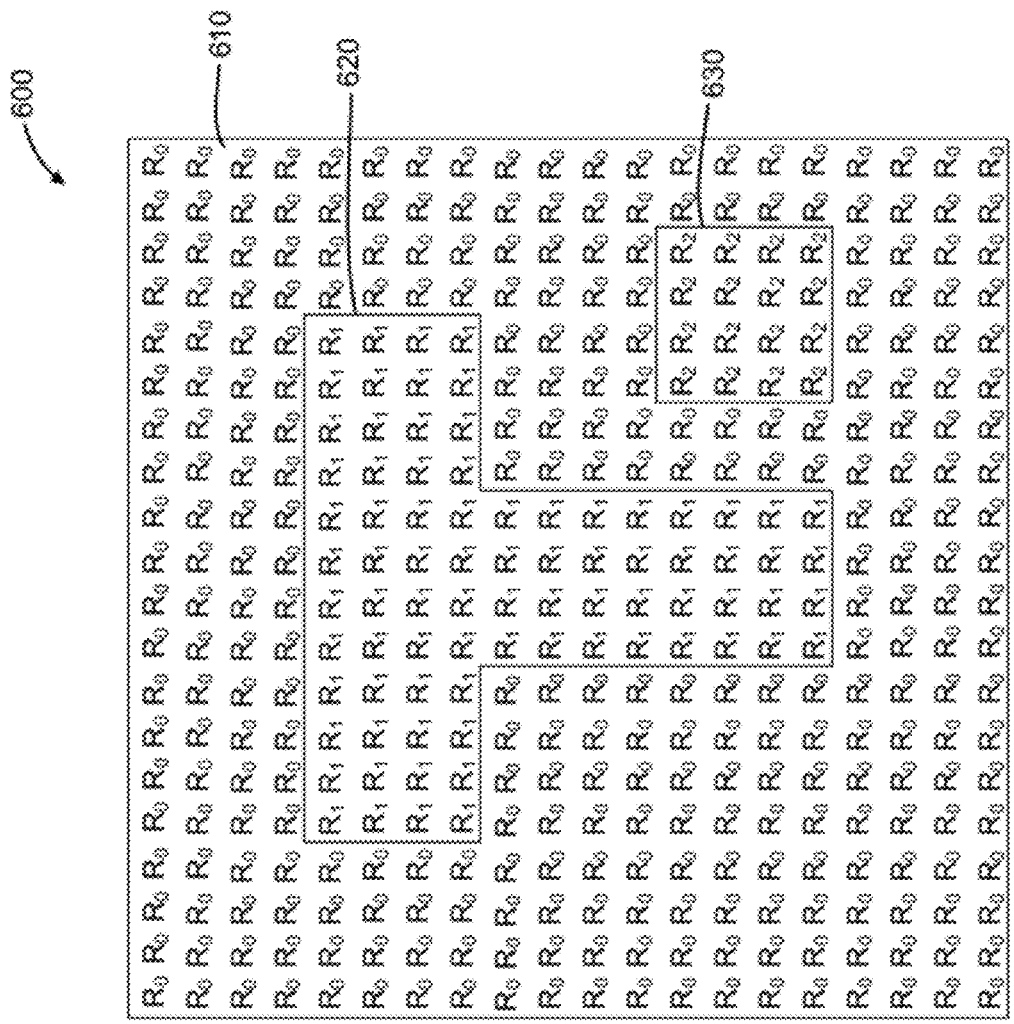
FIG. 6 is an exemplary graphical representation in one embodiment of the frame in FIG. 5 after each of the pixel positions has been assigned a pixel value range.

FIG. 6 is an exemplary graphical representation in one embodiment of the exemplary frame of FIG. 5 after each of the pixel positions has been assigned a pixel value range. In this embodiment, because each of the three spatial regions 610, 620 and 630 exhibit a different monochrome shading, three different pixel value ranges have been assigned to each of the pixel positions in that frame. The CPU 1060 can store the range assigned to each of the pixel positions in memory 1085.

With reference again to FIG. 4, in step 530, each of the pixel positions can be assigned a binary value based on that pixel position's assigned pixel value range, $R_0$ through $R_{X-1}$. Pixels in the range containing the lowest input pixel values, $R_0$, can all be assigned an output pixel value of 0, which can represent the lowest level of shading in a given image. Pixel positions in the range containing the highest input pixel values, $R_{X-1}$, can all be assigned an output pixel value of 1, which can represent the highest level of shading in a given image. In other embodiments, assigned output pixel values for the high and low ranges could be reversed such that pixel positions in the highest pixel value range are assigned output pixel values of 0, and pixel positions in the lowest pixel value range are assigned output pixel values of 1. Pixel positions in intermediate input pixel value ranges, $R_1$ through $R_{X-2}$, are assigned output pixel values that generate a selected spatial binary pattern, which is used to represent intermediate levels of shading between the lowest and highest levels.

Figure 7:
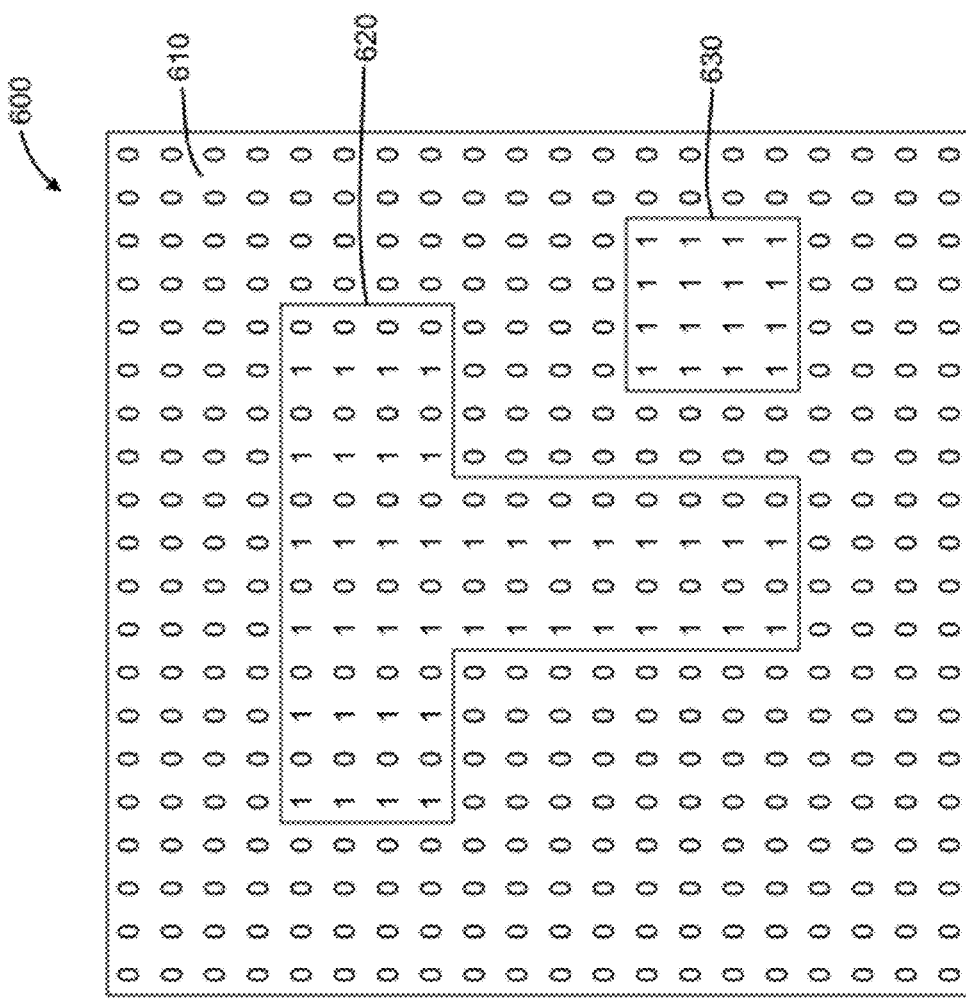
FIG. 7 is an exemplary graphical representation in one embodiment of the frame in FIG. 5 after each of the pixel positions has been assigned an output pixel value corresponding to the pixel value range for that pixel position.

FIG. 7 is an exemplary graphical representation of the exemplary frame of FIG. 5 after each of the pixel positions has been assigned an output pixel value corresponding to that pixel position's assigned pixel value range. In this example, all of the pixel positions of spatial region 610, which was assigned range $R_0$ in step 520, can be assigned a value of 0. Similarly, all of the pixel positions of spatial region 630, which was assigned range $R_1$ in step 520, can be assigned a value of 1. For pixel positions in spatial region 620, a pattern of alternating shaded and unshaded pixels can be applied such that shaded pixel positions are assigned a value of 1, while unshaded pixel positions are assigned a value of 0. A variety of different patterns can be chosen to correspond to different ranges, and assignment of a particular binary pattern to a given range can be determined, for example, dynamically by the CPU 1060, automatically according to information stored internally or externally to system 10000, or manually by a user either selecting from a group of available pattern choices or creating a custom pattern. The CPU 1060 can store the assigned output pixel values of each pixel position in memory 1085, with the data containing a binary representation of the frame such that each pixel position is represented only by an output pixel value of either 1 or 0, while preserving shade information in the original image.

In step 540, each of the pixel value ranges can be optionally assigned a shade. The shade assigned to each pixel value range can be determined, for example, dynamically by the CPU 1060, automatically according to information stored internally or externally to system 10000, or manually by a user selecting from a shade palette. In one embodiment, shades are not determined in step 540, but rather are determined subsequently when the image data is processed to render an image. In other embodiments, shades can be initially selected or defaulted for each pixel value range in step 540, and later manipulated and changed by the system 10000 or by a user to create a chosen visual effect or to improve the clarity, quality or visibility of content in the image.

Having assigned output pixel values to each pixel position, in step 550 the CPU can generate a binary file containing the processed image information stored in memory 1085 using any standard or custom file format. For example, the processed image information can be stored in a BMP file format containing the image data along with a header that stores general file information, detailed information about the image itself, for example the number of bits per pixel, here equal to 1, and the bitmap width and height, as well as information on the shades to be applied to each of the pixel value ranges determined. For example, in the three shade image example shown in FIG. 7, the header may contain information on the three shades to be applied to frame 600, one corresponding to each pixel value range. In other embodiments, information used to process the binary image data stored in the file can be retrieved from elsewhere internally or externally to system 10000.

Header information in standard file formats can be defaulted to standard or null values, or selected to suit particular processing needs. Use of a standard file format can allow the processed image data to be read and processed by legacy systems and other computers with standard viewers that are capable of accepting and processing that file format, such as a standard off-the-shelf bar code reader. Alternatively, the processed image data can be written to any custom file format. Enhanced functionality can be built into computers with custom viewers that are programmed to read and process such a custom file format, while processing capabilities when using standard file formats may be limited to the information and features associated with that chosen format.

Figure 8:
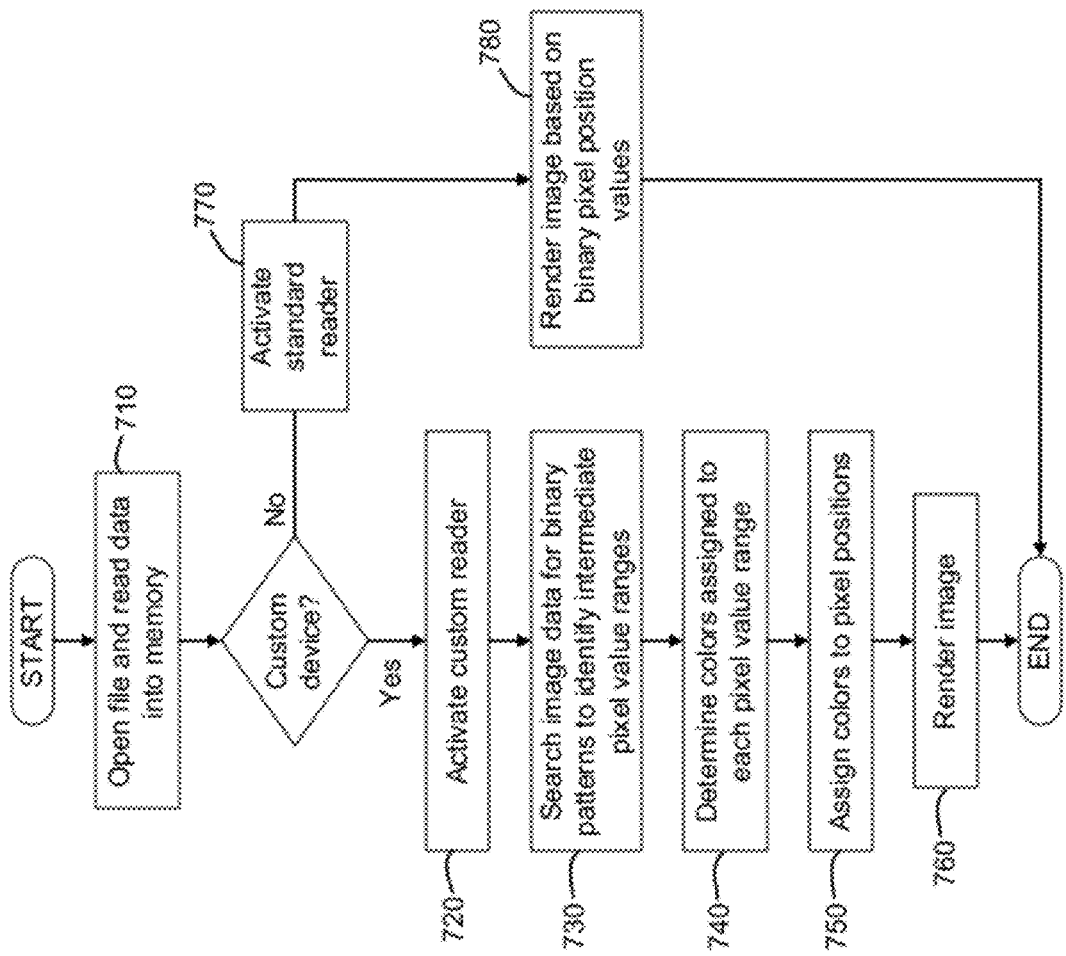
FIG. 8 is an exemplary flow diagram in one embodiment of the steps by which a file generated using the steps described in relation to FIG. 4 can be processed to render an image.

FIG. 8 is an exemplary flow diagram in one embodiment depicting the steps by which a file generated using the steps described in relation to FIG. 4 can be processed to render an image. In step 710, CPU 1060 opens the file to be processed and reads the data into memory 1085. The information loaded can include the binary image data itself, as well as file header information used to process that image data. Subsequent processing of the image data can be dependent on whether a computer having a custom viewer specifically programmed to render the stored image is used, or whether a computer having a standard viewer is used. Accordingly, in step 720, if a computer having custom viewer is being utilized, the custom reader is activated for processing the image file and rendering an image. If a computer having a standard viewer is used, in step 770 the standard reader is activated for processing the image file and rendering an image. Because the image data is stored in a universal binary format with each pixel position represented by a single bit of data, namely a 1 or a 0, a computer with a standard viewer capable of reading and processing a given file format can be capable of rendering a representation of the image based on that image data even without customized processing capabilities.

Figure 9:
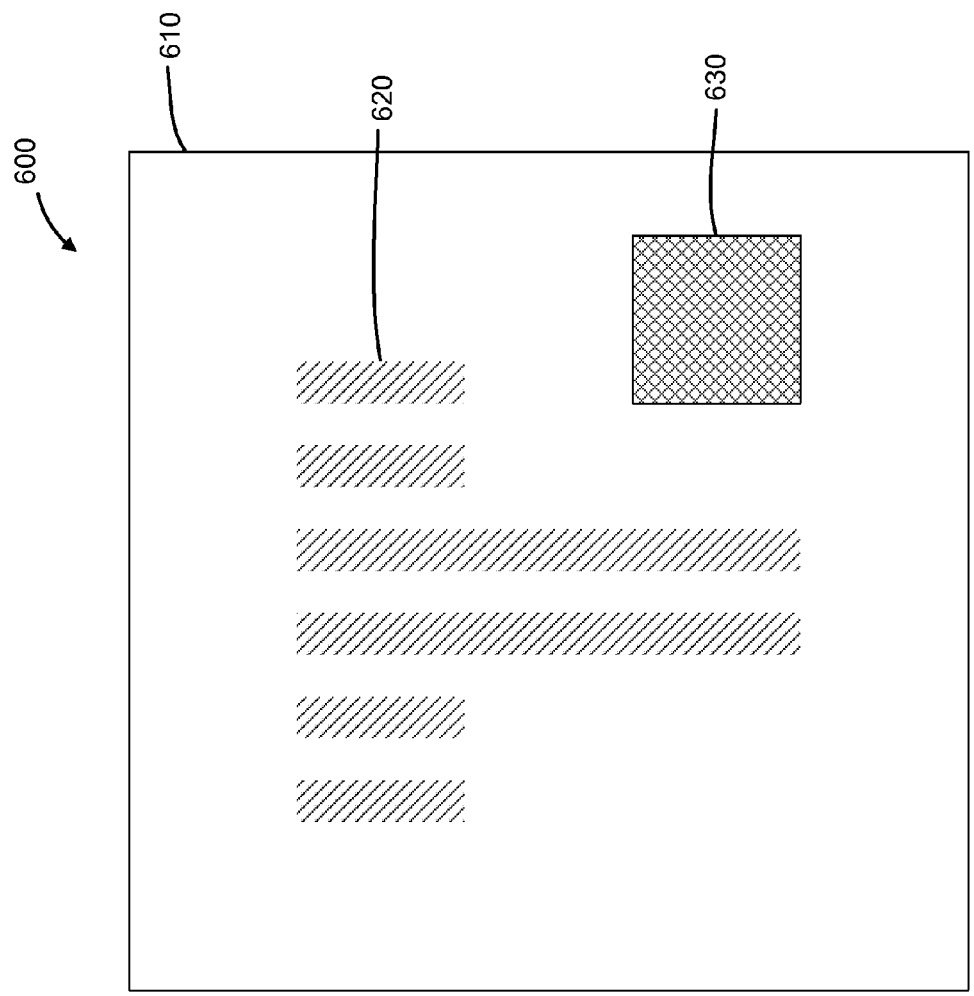
FIG. 9 is an exemplary graphical representation in one embodiment of an image produced when rendering an image from a binary image file created by the process depicted in FIG. 4 using a computer having a standard viewer.

For example, a computer or system 10000 comprising, for example, one or more terminals 100, servers 200, servers 400, and client computers 500, that does not have a custom viewer capable of rendering a custom image file format by processing the file as described with reference to FIG. 4 may lack the ability to search the image data for patterns and convert those patterns into chosen grayscales. However, because each of the pixel value ranges is represented by a different binary pattern, the image produced even without the custom decoding capabilities can have a useable representation of the original image. Accordingly, in step 780, an image may be rendered based on the binary pixel position values stored in the image data of the file. FIG. 9 is an exemplary graphical representation of an image produced by a computer with a standard viewer that lacks the pattern recognition and pixel value range shading capabilities described with regard to FIG. 8. Although spatial region 620 lacks the exact shading shown in the original image in FIG. 5, the visual effect created by the binary pattern applied to those pixel positions produces a useable likeness of the original image. Accordingly, the shade information in the original image is preserved.

To fully render all of the processed image data, a computer with a customized viewer can be utilized. For example, in step 730, once processed image data from the binary file is read into volatile system memory 1080 and the customer reader is activated, the CPU 1060 can be instructed to search that binary image data for the various patterns assigned to the intermediate pixel value ranges. As patterns are identified, the pixel positions whose output pixel values constitute a part of a given pattern are indicated as being a part of a particular pixel value range. Information on the binary patterns used can be located by the CPU 1060, for example, in the file header information or in some other storage medium internal or external to system 10000.

In step 740, the shades assigned to each pixel value range can be determined, for example, from information in the file header, information retrieved from elsewhere within system 10000, by the CPU 1060 in response to other processing parameters, or through user input. In some embodiments, for the purpose of creating a desired viewing effect, pseudo-colors can be assigned to the binary patterns instead of grayscale values. Accordingly, in step 750, each of the pixel positions can be assigned a color or grayscale value based on that pixel position's output pixel value, which was determined based on the assigned pixel range value. For example, pixel positions that are not identified as being part of a pattern and which are assigned a value of 0 can be assigned a first color or grayscale value. Similarly, pixel positions that are not identified as being part of a pattern and which are assigned a value of 1 can be assigned a second color or grayscale value. Lastly, pixel positions that are identified by the CPU 1060 as being part of a particular binary pattern can be assigned the color or grayscale value associated with that binary pattern.

In step 760, the processed file information, which now maps each pixel position to a color or grayscale value, can be used to render the image, despite the original image having been processed into, stored and retrieved from pure binary form. Because each of the pixel value ranges can be reproduced using any chosen color or grayscale value, different visual effects can be created in the rendered image to emphasize or downplay particular characteristics of the image in order to improve the usability and overall visual quality of the resulting image. For example, different colors can be applied to each of the pixel value ranges to embolden the visual appearance of those particular features in the image. Additionally, digital signal processing techniques and filters can be applied to the resulting image to achieve different results and visual effects.

Each of the steps of the processes described with respect to FIGS. 4 and 8 can be performed individually by CPU 1060 of image reading terminal 100, by server 200, by server 400, by client computer 500, or by a plurality of such computers, such as one or more of CPU 1060 of image reading terminal 100, server 200, server 400, or client computer 500 in a distributed computing environment. System 10000 or a computer of system 10000, e.g. a terminal 100, server 200, server 400, or client computer 500 can be operative to perform the processing described with reference to the flow diagrams of FIGS. 4 and 9 by making use of a computer program product comprising executable program code stored in a computer readable medium. In one embodiment, the program code can contain executable instructions that enable a computer of system 10000, or alternatively a plurality of computers of system 10000, to implement various functions as described with reference to FIGS. 4 and 8.

Additionally, methods and systems operative to process color image data, as well as numerous additional method and apparatus elements, are set forth in U.S. application Ser. No. 12/947,055 filed on the filing date of the present application. The entirety of method and system elements described in U.S. application Ser. No. 12/947,055 can be utilized with the method and system elements set forth herein. U.S. application Ser. No. 12/947,055 is incorporated herein by reference.

It will be appreciated that the method and system disclosed herein can be applied to any system involving image data collection, processing or storage, for example, scanners, digital cameras, cell phones, and mobile computers. Additional features of system 10000 are described with reference to the following examples:

Example 1

In one example of how the disclosed techniques could be implemented on system 10000, a set of computer instructions capable of implementing the image data processing steps described with reference to FIGS. 4 and 8 can be deployed on a terminal 100 such that the instructions can be executed by CPU 1060. A user of terminal 100 would then be able to capture a raw frame of image data using terminal 100, which could then process that image data to determine the pixel value ranges of the image data, assign pixel positions in the low and high ranges values of 0 and 1, respectively, and spatial binary patterns to the intermediate ranges. Terminal 100 could then produce a custom file containing the processed image data and information concerning the patterns applied and the colors or shades that should be applied to each of the ranges. The file produced could be stored in terminal 100, or saved to another data storage medium internally within or externally to system 10000.

If the user subsequently wishes to view the stored image, the terminal 100 could retrieve the processed image file. The CPU 1060 could then read the binary image data into memory 1085 and search for patterns representative of the different pixel value ranges. Each pixel position could then be assigned the color or grayscale value for that pixel position's pixel value range, and the image could be rendered on the display 1140.

Because the image data is highly compressed, with each pixel position being represented by only one bit of data, the size of the processed image file can be small compared to other common image files. Accordingly, the file can be easily transferred between different media and systems either through some form of data storage medium or a wireless or landline network. The small file size can shorten the time needed to transfer image files over and between different data networks, and can also improve data reliability and result in fewer data errors. In addition, because the colors applied to the different ranges can be arbitrarily chosen, color can be added to what may have previously been a monochrome image to improve the visual quality of that image. Likewise, different colors can be chosen to enhance or minimize selected image characteristics.

Example 2

In another example, in one embodiment, the disclosed method or system can be applied to existing monochrome image files to improve the quality of those images. Any computer or computers equipped with program code containing a set of computer instructions capable of implementing the image data processing steps described with reference to FIGS. 4 and 8 can be deployed to process that image data. As described in relation to FIGS. 4 and 8, the disclosed techniques can be utilized to enhance or minimize selected image characteristics in order to improve the overall visual quality and readability of that image. For example, a user faced with a poor image of a document containing a white background, gray watermark and black foreground text, wherein the presence of the watermark obscures the foreground content, could employ system 10000 to process that image data to minimize or extract the watermark. Accordingly, the watermark could be represented as one of the pixel value ranges and assigned a white or other color that minimizes its representation in the rendered image to enhance the readability of the foreground text.

In other embodiments, a computer with a customized viewer programmed to implement the data processing techniques described in relation to FIGS. 4 and 8 may be unavailable to process and view an image file that was previously created using the disclosed technique. However, because each pixel position value is represented by either a 1 or a 0, if the image file to be viewed is of a given standard file type and a terminal 100 or other computer having a standard viewer being used to view that image is capable of reading and processing that file type, the terminal 100 or other computer having a standard viewer will be able to produce a representative image.

A small sample of systems, methods, and apparatus that are described herein is as follows:

A1. A method for representing a monochrome image as binary data, comprising the steps of:

receiving a frame of monochrome image data, said frame of monochrome image data comprising a plurality of input pixel values corresponding to a plurality of pixel positions in an image, wherein said input pixel values are represented as N-bit values, and wherein N>1;

defining a plurality of pixel value ranges, said pixel value ranges comprising a low range, a high range, and at least one intermediate range;

assigning each of said input pixel values to one of said pixel value ranges;

assigning pixel positions having input pixel values assigned to said low range an output pixel value that is a first binary value;

assigning pixel positions having input pixel values assigned to said high range an output pixel value that is a second binary value, wherein said second binary value is different than said first binary value; and assigning pixel positions having input pixel values assigned to said at least one intermediate range output pixel values representative of a spatial binary pattern, wherein said spatial binary pattern assigned to each of said at least one intermediate ranges is different.

A2. The method of A1, wherein said first binary value is 0 and said second binary value is 1.

A3. The method of A1, wherein said first binary value is 1 and said second binary value is 0.

A4. The method of A1, further comprising the step of writing said output pixel values to a file.

A5. The method of A4, wherein said file comprises said output pixel values and a header comprising information on said spatial binary pattern.

A6. The method of A1, further comprising the step of assigning colors to said pixel value ranges.

A7. The method of A6, further comprising the step of writing said output pixel values to a file, wherein said file comprises said output pixel values and a header comprising information on said spatial binary pattern and said colors.

A8. The method of A4, wherein said file is in an industry standard file format.

A9. The method of A4, wherein said file is in a custom file format.

A10. The method of A1, wherein said steps are performed by a computer in response to a trigger actuation.

A11. The method of A1, wherein said steps are automatically performed by a computer in response to receiving said frame of image data.

A12. The method of A4, further comprising the step of reading the data stored in said file and rendering an image using said data.

B1. A system for converting a monochrome image to binary data, comprising:
  one or more computers operative to:
  receive a frame of monochrome image data, said frame of monochrome image data comprising a plurality of input pixel values corresponding to a plurality of pixel positions in an image, wherein said input pixel values are represented as N-bit values, and wherein N>1;
  define a plurality of pixel value ranges, said pixel value ranges comprising a low range, a high range, and at least one intermediate range;
  assign each of said input pixel values to one of said pixel value ranges;
  assign pixel positions having input pixel values assigned to said low range an output pixel value that is a first binary value;
  assign pixel positions having input pixel values assigned to said high range an output pixel value that is a second binary value, wherein said second binary value is different than said first binary value; and
  assign pixel positions having input pixel values assigned to said at least one intermediate range output pixel values representative of a spatial binary pattern, wherein said spatial binary pattern assigned to each of said at least one intermediate ranges is different.

C1. A computer program product for processing image data, said computer program product including:
  a computer readable medium;
  first program code for receiving a frame of monochrome image data, said frame of monochrome image data comprising a plurality of input pixel values corresponding to a plurality of pixel positions in an image, wherein said input pixel values are represented as N-bit values, and wherein N>1;
  second program code for defining a plurality of pixel value ranges, said pixel value ranges comprising a low range, a high range, and at least one intermediate range;
  third program code for assigning each of said input pixel values to one of said pixel value ranges; and
  fourth program code for assigning pixel positions having input pixel values assigned to said low range an output pixel value that is a first binary value, assigning pixel positions having input pixel values assigned to said high range an output pixel value that is a second binary value, wherein said second binary value is different than said first binary value, and assigning pixel positions having input pixel values assigned to said at least one intermediate range output pixel values representative of a spatial binary pattern, wherein said spatial binary pattern assigned to each of said at least one intermediate ranges is different;
  wherein said first, second, third and fourth program code is recorded on said computer readable medium.

C2. The computer program product of C1, further comprising fifth program code for writing said output pixel values to a file, wherein said fifth program code is recorded on said computer readable medium.

C3. The computer program product of C2, wherein said file comprises said output pixel values and a header comprising information on said spatial binary pattern.

C4. The computer program product of C1, further comprising fifth program code for assigning colors to said pixel value ranges, wherein said fifth program code is recorded on said computer readable medium.

C5. The computer program product of C4, further comprising sixth program code for writing said output pixel values to a file, wherein said file comprises said output pixel values and a header comprising information on said spatial binary pattern and said colors, and wherein said sixth program code is recorded on said computer readable medium.

C6. The computer program product of C2, wherein said file is in an industry standard file format.

C7. The computer program product of C2, wherein said file is in a custom file format.

C8. The computer program product of C1, wherein said first through fourth program code is executed by a computer in response to a trigger actuation.

C9. The computer program product of C1, wherein said first through fourth program code is executed by a computer in response to receiving said frame of image data.

C10. The computer program product of C2, further comprising sixth program code for processing said file to render an image, wherein said sixth program code is recorded on said computer readable medium.

D1. A system for converting a monochrome image to a binary file, comprising:
  one or more computers, wherein said one or more computers is operative to transform an input frame of monochrome image data having input pixel values expressed as N-bit values, wherein N>1, into a custom file format that is readable with both a standard reader program and a custom reader program, said one or more computers having said standard reader program and said custom reader program;
  wherein in transforming said input frame of monochrome image data said one or more computers is operative to assign pixel positions having input pixel values in an intermediate range to a set of single bit pixel values representative of a spatial binary pattern;
  wherein the system is operative so that when said custom file format is read utilizing a standard reader, an image is rendered so that pixel positions represented by said spatial binary pattern appear as said spatial binary pattern;
  wherein the system is operative so that when said custom file format is read utilizing a custom reader, an image is rendered so that pixel positions represented by said spatial binary pattern appear as color other than black or white and without said spatial binary pattern.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than or greater than the mentioned certain number of elements. Also, while a number of particular embodiments have been described, it will be understood that features and aspects that have been described with reference to each particular embodiment can be used with each remaining particularly described embodiment.

We claim:

1. A method for representing a monochrome image as binary data, comprising:
    receiving a frame of monochrome image data, said frame of monochrome image data comprising a plurality of input pixel values corresponding to a plurality of pixel positions in an image, wherein said input pixel values are represented as N-bit values, and wherein N>1;
    defining a plurality of pixel value ranges, said pixel value ranges comprising a low range, a high range, and at least one intermediate range;
    assigning each of said input pixel values to one of said pixel value ranges;
    assigning pixel positions having input pixel values assigned to said low range an output pixel value that is a first binary value;
    assigning pixel positions having input pixel values assigned to said high range an output pixel value that is a second binary value, wherein said second binary value is different than said first binary value; and
    assigning pixel positions having input pixel values assigned to said at least one intermediate range output pixel values representative of a spatial binary pattern, wherein said spatial binary pattern assigned to each of said at least one intermediate ranges is different.

2. The method of claim 1, wherein said first binary value is 0 and said second binary value is 1.

3. The method of claim 1, wherein said first binary value is 1 and said second binary value is 0.

4. The method of claim 1, further comprising writing said output pixel values to a file.

5. The method of claim 4, wherein said file comprises said output pixel values and a header comprising information on said spatial binary pattern.

6. The method of claim 4, wherein said file is in an industry standard file format.

7. The method of claim 4, wherein said file is in a custom file format.

8. The method of claim 4, further comprising reading the data stored in said file and rendering an image using said data.

9. The method of claim 1, further comprising assigning colors to said pixel value ranges.

10. The method of claim 9, further comprising writing said output pixel values to a file, wherein said file comprises said output pixel values and a header comprising information on said spatial binary pattern and said colors.

11. The method of claim 1, wherein said assigning pixel positions having input pixel values assigned to said at least one intermediate range output pixel values representative of a spatial binary pattern is performed by a computer in response to a trigger actuation.

12. The method of claim 1, wherein said assigning pixel positions having input pixel values assigned to said at least one intermediate range output pixel values representative of a spatial binary pattern is automatically performed by a computer in response to receiving said frame of image data.

13. The method of claim 1, wherein pixel positions of the plurality of pixel positions correspond to pixel positions of an image sensor array.

14. A system for converting a monochrome image to binary data, comprising:
    one or more computers operative to:
    receive a frame of monochrome image data, said frame of monochrome image data comprising a plurality of input pixel values corresponding to a plurality of pixel positions in an image, wherein said input pixel values are represented as N-bit values, and wherein N>1;
        define a plurality of pixel value ranges, said pixel value ranges comprising a low range, a high range, and at least one intermediate range;
        assign each of said input pixel values to one of said pixel value ranges;
    assign pixel positions having input pixel values assigned to said low range an output pixel value that is a first binary value;
        assign pixel positions having input pixel values assigned to said high range an output pixel value that is a second binary value, wherein said second binary value is different than said first binary value; and
        assign pixel positions having input pixel values assigned to said at least one intermediate range output pixel values representative of a spatial binary pattern, wherein said spatial binary pattern assigned to each of said at least one intermediate ranges is different.

15. A computer program product for processing image data, said computer program product including:
    a non-transitory computer readable medium;
    first program code for receiving a frame of monochrome image data, said frame of monochrome image data comprising a plurality of input pixel values corresponding to a plurality of pixel positions in an image, wherein said input pixel values are represented as N-bit values, and wherein N>1;
        second program code for defining a plurality of pixel value ranges, said pixel value ranges comprising a low range, a high range, and at least one intermediate range;
    third program code for assigning each of said input pixel values to one of said pixel value ranges; and
        fourth program code for assigning pixel positions having input pixel values assigned to said low range an output pixel value that is a first binary value, assigning pixel positions having input pixel values assigned to said high range an output pixel value that is a second binary value, wherein said second binary value is different than said first binary value, and assigning pixel positions having input pixel values assigned to said at least one intermediate range output pixel values representative of a spatial binary pattern, wherein said spatial binary pattern assigned to each of said at least one intermediate ranges is different;
    wherein said first, second, third and fourth program code is recorded on said computer readable medium.

16. The computer program product of claim 15, further comprising fifth program code for writing said output pixel values to a file, wherein said fifth program code is recorded on said computer readable medium.

17. The computer program product of claim 16, wherein said file comprises said output pixel values and a header comprising information on said spatial binary pattern.

18. The computer program product of claim 16, wherein said file is in an industry standard file format.

19. The computer program product of claim 16, wherein said file is in a custom file format.

20. The computer program product of claim 16, further comprising sixth program code for processing said file to render an image, wherein said sixth program code is recorded on said computer readable medium.

21. The computer program product of claim 15, further comprising fifth program code for assigning colors to said pixel value ranges, wherein said fifth program code is recorded on said computer readable medium.

22. The computer program product of claim 21, further comprising sixth program code for writing said output pixel values to a file, wherein said file comprises said output pixel values and a header comprising information on said spatial binary pattern and said colors, and wherein said sixth program code is recorded on said computer readable medium.

23. The computer program product of claim 15, wherein said first through fourth program code is executed by a computer in response to a trigger actuation.

24. The computer program product of claim 15, wherein said first through fourth program code is executed by a computer in response to receiving said frame of image data.

\* \* \* \* \*